(12) United States Patent
Vander Sluis et al.

(10) Patent No.: US 12,377,781 B2
(45) Date of Patent: Aug. 5, 2025

(54) INTEGRATED IN-SURFACE LENS ASSEMBLY

(71) Applicant: Magna Exteriors Inc., Aurora (CA)

(72) Inventors: Daniel Vander Sluis, Rochester Hills, MI (US); Patrick Gerrity, Dearborn, MI (US); Oliver Pace, Clarkston, MI (US)

(73) Assignee: MAGNA EXTERIORS, INC., Aurora (CA)

( * ) Notice: Subject to any disclaimer, the term of this patent is extended or adjusted under 35 U.S.C. 154(b) by 0 days.

(21) Appl. No.: 18/937,343

(22) Filed: Nov. 5, 2024

(65) Prior Publication Data

US 2025/0058707 A1    Feb. 20, 2025

Related U.S. Application Data

(63) Continuation-in-part of application No. 18/597,814, filed on Mar. 6, 2024, now Pat. No. 12,151,610.
(Continued)

(51) Int. Cl.
| | |
|---|---|
| *B60Q 3/60* | (2017.01) |
| *B60Q 1/00* | (2006.01) |
| *B60Q 3/51* | (2017.01) |
| *B60Q 3/54* | (2017.01) |
| *F21V 5/04* | (2006.01) |
| *F21V 7/04* | (2006.01) |
| *F21V 13/04* | (2006.01) |
| *F21V 17/10* | (2006.01) |

(Continued)

(52) U.S. Cl.
CPC .............. *B60Q 3/60* (2017.02); *B60Q 1/0035* (2013.01); *B60Q 3/51* (2017.02); *B60Q 3/54* (2017.02); *F21V 5/04* (2013.01); *F21V 7/043* (2013.01); *F21V 13/04* (2013.01); *F21V 17/101* (2013.01); *F21V 19/004* (2013.01); *F21Y 2103/00* (2013.01); *F21Y 2115/10* (2016.08)

(58) Field of Classification Search
CPC .... B60Q 1/0029–0035; B60Q 3/50–68; F21V 5/00–048; F21V 7/043; F21V 13/04; F21V 17/101; F21V 17/164; F21V 17/18; F21V 19/003–004; F21Y 2103/00; F21Y 2115/10
See application file for complete search history.

(56) References Cited

U.S. PATENT DOCUMENTS 7,682,056 B2 *   3/2010   Furtwangler ........ B60Q 1/2665
                                                            362/547

* cited by examiner

*Primary Examiner* — Jason M Han
(74) *Attorney, Agent, or Firm* — Warn Partners, P.C.

(57) ABSTRACT

A seamless lighting arrangement for a vehicle panel. The vehicle panel has an inside surface and an outside surface. The vehicle panel has a light aperture extending from the inside surface of the vehicle panel to the outside surface of the vehicle panel. Connected to the inside surface of the vehicle panel is a bracket. The seamless lighting arrangement further includes a lens with a bracket connection portion that connects to the bracket and a transmission portion positioned within the light aperture of the vehicle panel. The lens further includes a light unit fixedly connected to the lens. The light unit has a projector port for emitting light from a light source. The light transmission portion of the lens has a light input surface region formed on an inside surface of the lens and a light output surface region formed on an outside surface of the lens.

13 Claims, 14 Drawing Sheets

Related U.S. Application Data which is a continuation of application No. 18/130,055, filed on Apr. 3, 2023, now abandoned.

(60) Provisional application No. 63/330,845, filed on Apr. 14, 2022.

(51) Int. Cl.
*F21V 19/00* (2006.01)
*F21Y 103/00* (2016.01)
*F21Y 115/10* (2016.01)

INTEGRATED IN-SURFACE LENS ASSEMBLY

FIELD OF THE INVENTION

The present invention relates to an integrated in-surface lens assembly.

BACKGROUND OF THE INVENTION

In the field of automotive lighting design, lighting units are connected to various vehicle body panels for illuminating various areas both inside and outside of the vehicle. The lighting units are often quite large and require numerous components to be assembled together using several assembly steps. It is an object of the invention to provide a lighting unit that minimizes the number of components that need to be assembled, thereby reducing the complexity and number of assembly steps. It is further an object of the invention to provide a design flexible solution integrating an "in-surface sealing clear lens" to a larger "opaque" panel (i.e., not light transmitting). This "in-surface sealing clear lens" assembly is positioned and affixed to a panel opening made in the larger panel surface allowing: 1) protection of the light source and 2) projected light to be transmitted to the ground or surrounding area around an automotive vehicle or vehicular mobility unit.

SUMMARY OF THE INVENTION

The present invention is directed to a seamless lighting arrangement for a vehicle panel. The vehicle panel can be any type of exterior or interior panel, including, but not limited to bumper fascia, rocker panels, quarter panels, spoilers, door panels, mirror housings, instrument panels, headliners, interior door panels, etc. The vehicle panel has a light aperture extending from an inside surface of the vehicle panel to an outside surface of the vehicle panel. Connected to the inside surface of the vehicle panel is a bracket at a location near the light aperture. The seamless lighting arrangement further includes a lens with a bracket connection portion that connects to the bracket and a transmission portion positioned within the light aperture of the vehicle panel. The lens further includes a light unit fixedly connected to the lens. The light unit has a projector port for emitting light from a light source. The light transmission portion of the lens has a light input surface region formed on an inside surface of the lens and a light output surface region formed on an outside surface of the lens.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
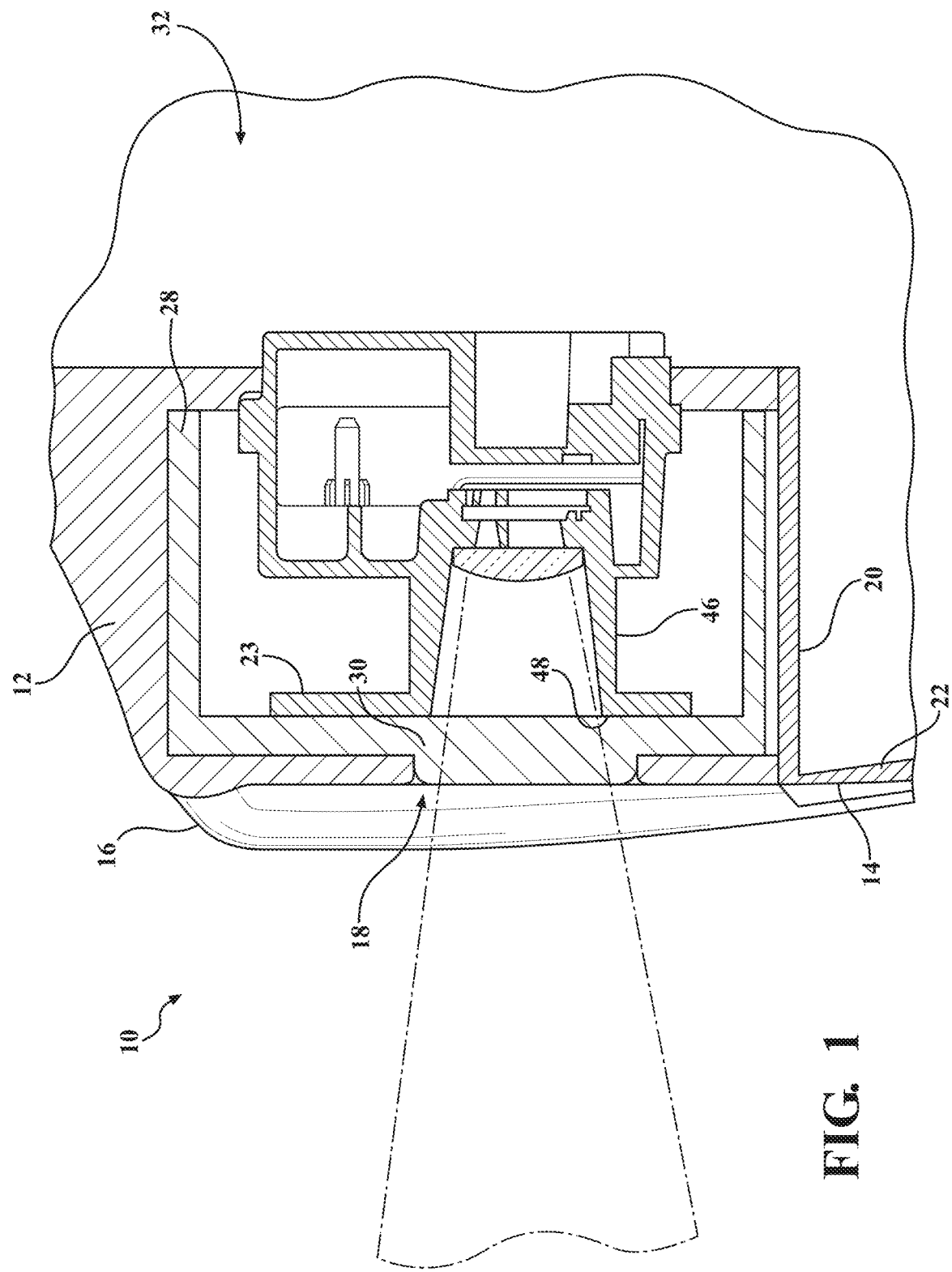
FIG. 1 is a side elevational cross-sectional view of a seamless lighting arrangement of a first embodiment of the present invention.
Figure 2:
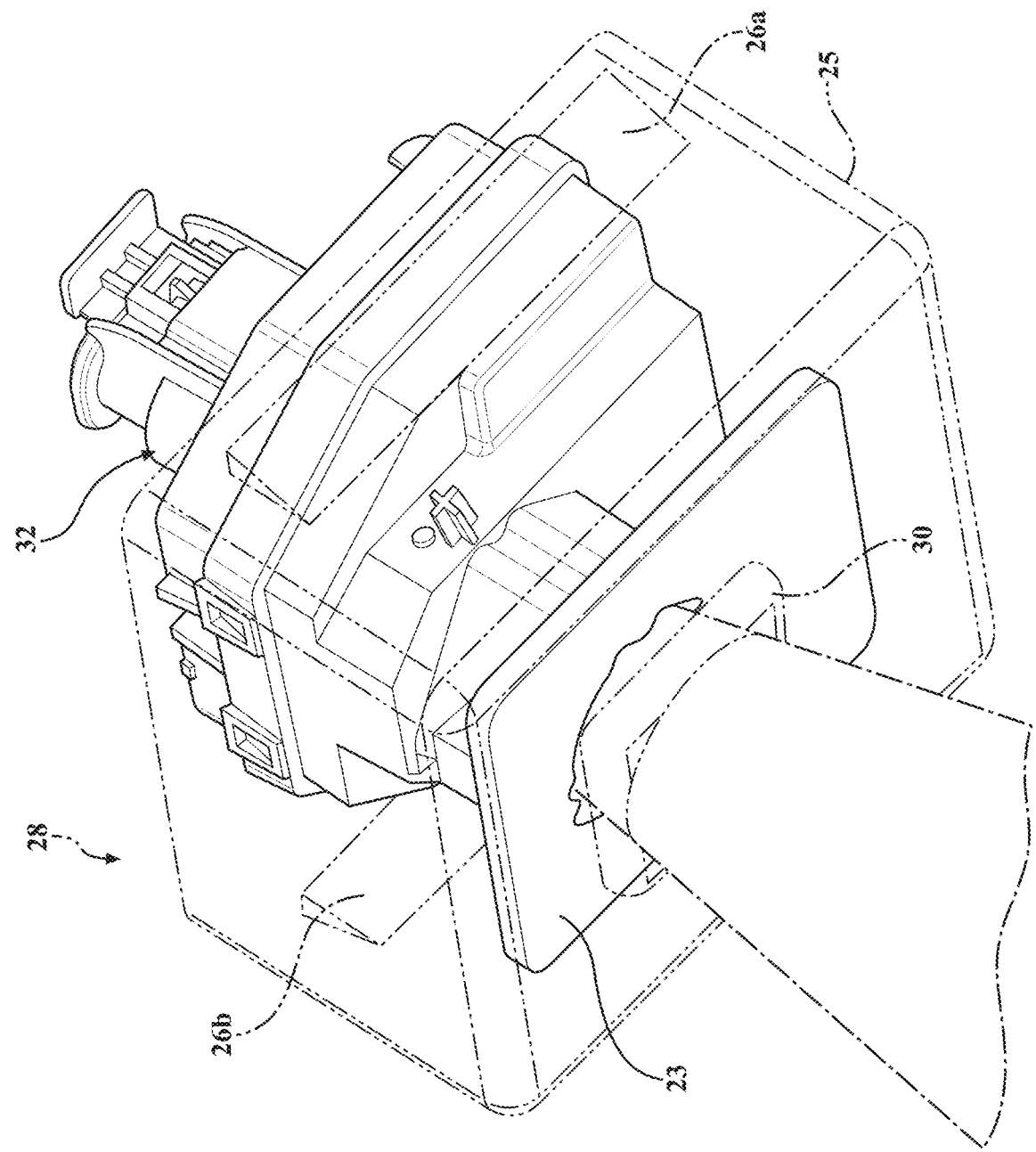
FIG. 2 is a side perspective view of the lens and light unit with portions shown in phantom.
Figure 3:
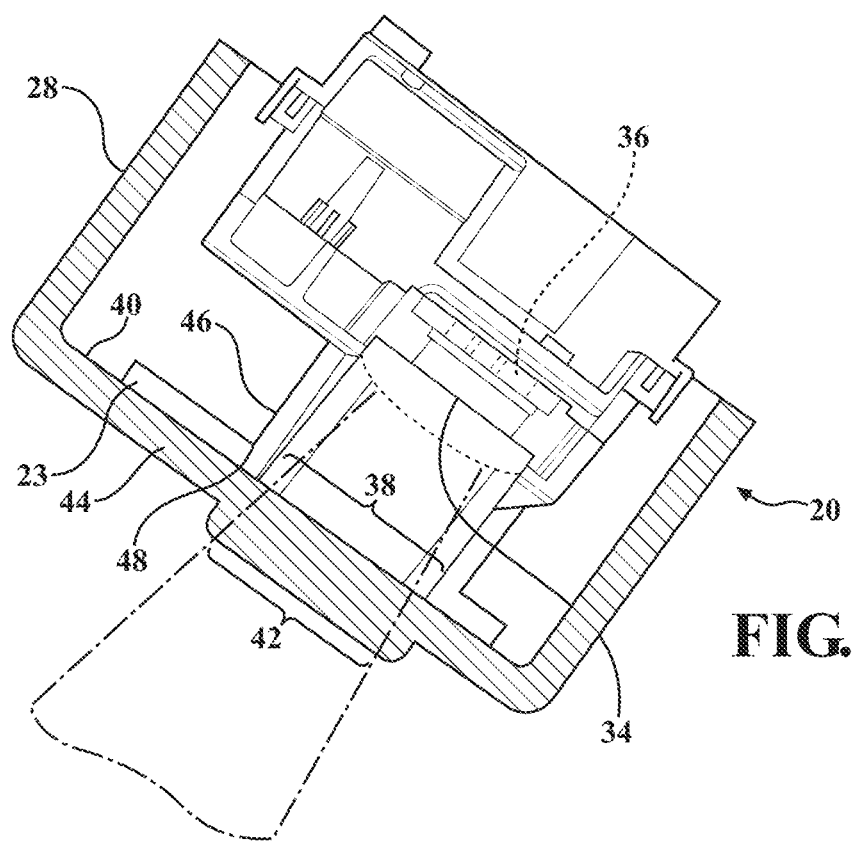
FIG. 3 is a side cross-sectional view of the lens and light unit.
Figure 4:
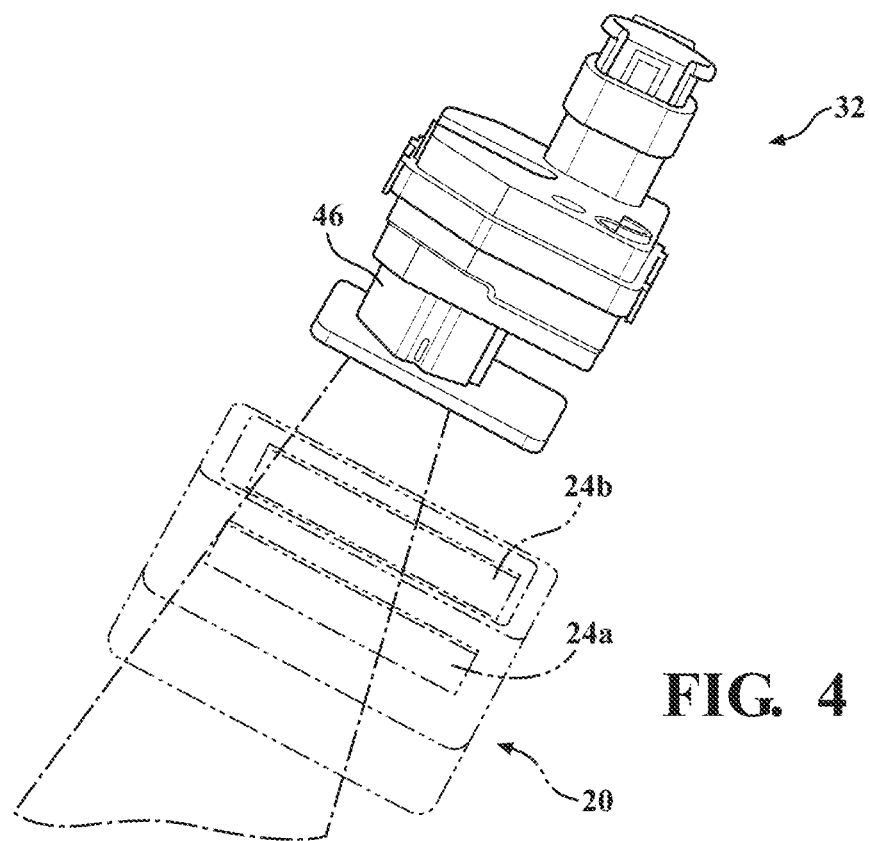
FIG. 4 is an exploded side perspective view of the lens and light unit.
Figure 5:
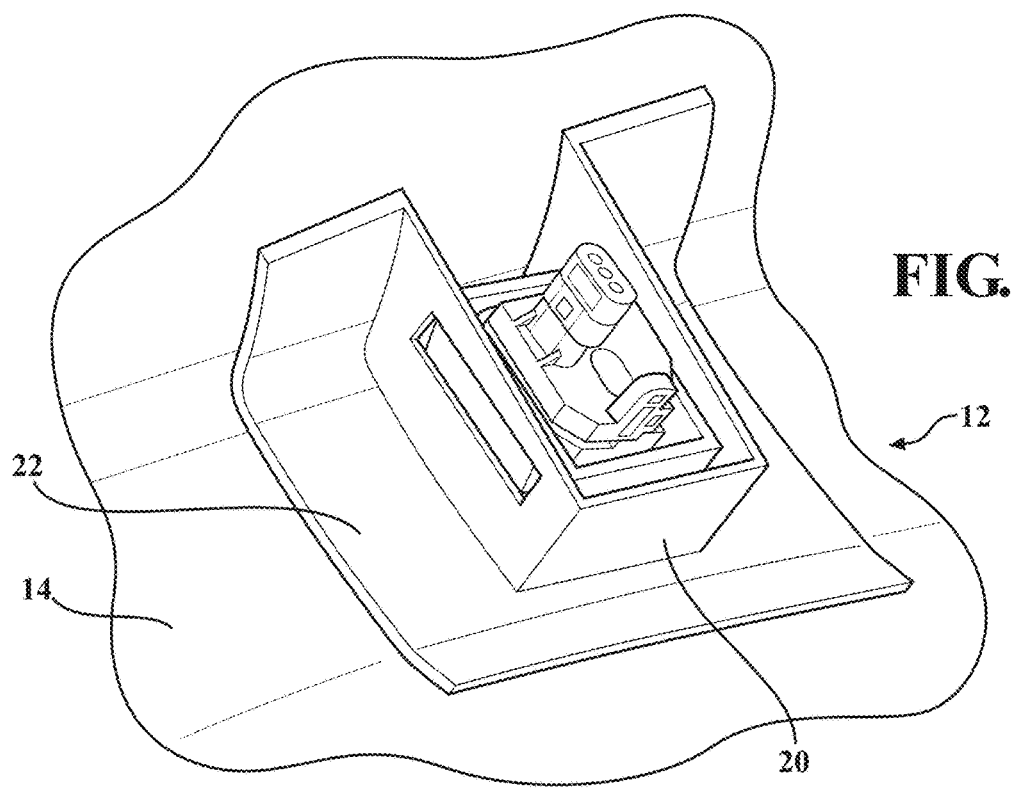
FIG. 5 is a rear perspective view of the seamless lighting arrangement.

The following description of the preferred embodiments is merely exemplary in nature and is in no way intended to limit the invention, its application, or uses.

Referring now to the FIGS. 1-8, a seamless lighting arrangement 10 for a vehicle panel 12 is shown. The seamless lighting arrangement 10 transmits light from a light unit 32 that is connected to the vehicle panel with a lens 28. The vehicle panel 12 can be any type of exterior or interior panel, including, but not limited to bumper fascia, rocker panels, quarter panels, spoilers, door panels, mirror housings, instrument panels, headliners, interior door panels, etc. The vehicle panel 12 has an inside surface 14 and an outside surface 16. The vehicle panel 12 has a light aperture 18 extending from the inside surface 14 of the vehicle panel 12 to the outside surface 16 of the vehicle panel 12.

Connected to the inside surface 14 of the vehicle panel 12 is a bracket 20 that is used to connect the lens 28 with the light unit 32 to the inside surface 14 of the vehicle panel. The bracket 20 has a flange 22 that connects the bracket 20 to the inside surface 14 using adhesives, welding, fastener clips, snap lock features or fasteners depending on the needs of a particular application. It is also within the scope of this invention for some embodiments to include a bracket that is integrally molded to the inside surface 14 of the vehicle panel.

The lens 28 includes a housing 25 that connects to both the bracket 20 and the light unit 32. As shown in FIG. 1 on a housing 225 of a lens 228 in FIG. 8, which is an alternate embodiment, the connection between the housing 25, 225 and the bracket 20 is provided by lens connections 24a, 24b that that are apertures formed on the bracket 20 for receiving a bracket connection portion 26a, 26b of the housing 25, 225. The bracket connection portion 26a, 26b is a snap tang that snaps into a respective one of the two lens connections 24a, 24b. This type of connection allows the lens 28 to be easily connected with the bracket 20 and aligned with the light aperture 18 of the vehicle panel 12. While a snap tang connection is shown it is within the scope of the invention for other physical connections to be used, provided suitable alignment of the lens in the light aperture 28 is accomplished. For example, the snap tang could simply be a ridge formed on the housing 25 and the solid walls of the bracket 20 bend to allow the housing 25 to push into place. Other suitable connections include fasteners, clip retainers, double sided tape, or adhesives. Also, while the lens connections 24a, 24b and bracket connection portion 26a, 26b are shown as two in number, it is within the scope of the invention for there to be a greater or lesser number depending on the need of a particular application.

The lens 28 of the seamless lighting arrangement 10 also has a transmission portion 30 positioned within the light aperture 18 of the vehicle panel 12. The lens 28 further includes the light unit 32 fixedly connected to the lens 28. The light unit 32 has a projector port 34 for emitting light from a light source 36, which is a light emitting diode, halogen bulb or incandescent bulb. The light transmission portion 30 of the lens 28 has a light input surface region 38 formed on an inside surface 40 of the lens 28 and a light output surface region 42 formed on an outside surface 44 of the lens 28. The light output surface region 42 of the light transmission portion 30 extends through the light aperture 18 from the inside surface 14 of the vehicle panel 12 to the outside surface 16 of the vehicle panel 12. The light transmission portion 30 is the area of the lens 28 that light is transmitted or refracted through as the light is projected from the light source 36 through the lens 28 and light aperture 18 to a desired area.

Figure 8:
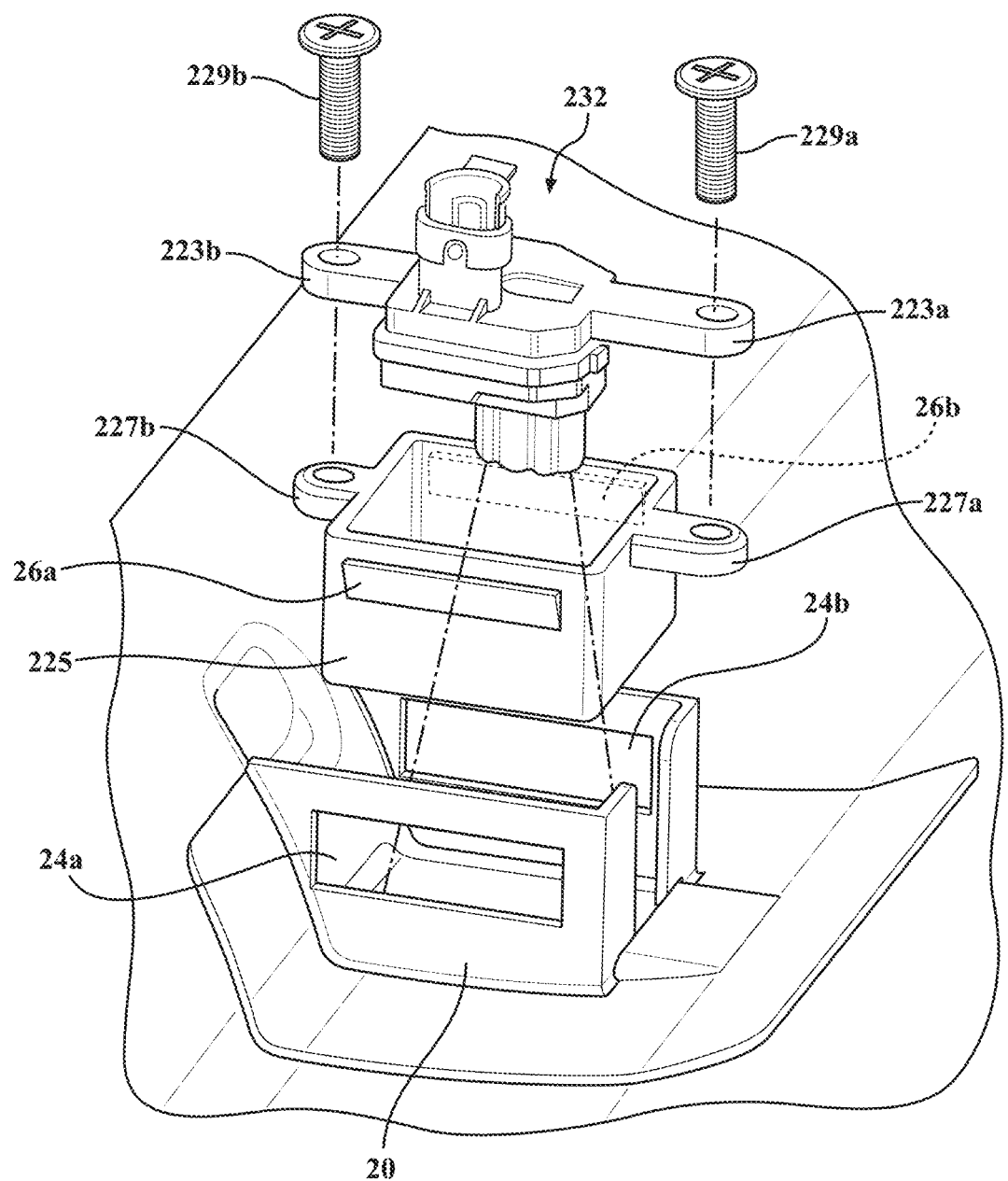
FIG. 8 is an exploded side perspective view of the seamless lighting arrangement according to the third embodiment of the invention.

The light unit 32 further includes a housing 33 that has a light tube 46 extending from the projector port 34 that connects at a distal end 48 to the lens 28 at the light input surface region 38 of the transmission portion 30. At the distal end 48 of the light tube 46 there is also a flange 23 extending from the housing 33 of the light unit 32 that is used to align and connect the light unit 32 to the lens 28. The flange 23 is connected to the lens 28 using welding, adhesives, or other connections. The flange 23 also defines the boundary of the light input surface region 38. FIG. 8 shows the light unit 232 according to an alternate embodiment of the invention. In this embodiment of the invention there are similar structures to the embodiment shown in FIG. 1, but the light unit 232 has a housing 333 that does not have the flange 23 as shown in FIG. 1. Instead housing 333 has two fastener tabs 223a, 223b that align and connect with two fastener bosses 227a, 227b extending from the surface of the housing 225 of the lens 228. Fasteners 229a, 229be are used to complete the connection by respectively extending through the fastener tabs 223a, 223b and engaging the respective one of the fasteners bosses 227a, 227b. The fasteners 229a, 229b are threaded fasteners or any other suitable type of fastener. This eliminates the need to use welding or adhesives with the flange 23 as described above. The light tube 46 functions to gather, direct and focus the light in a desired direction from the projector port 34. In particular where the light source involves several light elements, such as light emitting diodes, the light tube 46 can have reflective coatings on the surface that gather and focus the light from the multiple light sources to a desired direction. The lens 28 is connected to the projector port 34 using a weld or adhesives. More specifically it is shown that the distal end 48 of the light tube 46 is connected to the inside surface 40 of the lens. The use of the light tube 46 is an optional feature that is not required by all embodiments. In embodiments where a light tube 46 is not present the connection can be a connection between the lens 28 and the projector port 34. The connection between the lens 28 and the distal end 48 is a fixed and sealed connection that protects the light source 36 and inside components of the light unit 32 from unwanted elements such as water and dirt. The connection can be accomplished using adhesives, welding, or any other suitable connection method.

The light unit 32 is configured to receive command signals from an external controller that is located remotely from the light unit 32 and the seamless light arrangement 10. This allows the light unit 32 to be smaller since it is not necessary to have additional circuitry in the light unit 32. Furthermore, a single controller can control multiple light units. However, it is within the scope of this invention for the controller to be located on the light unit 32 itself.

Figure 6:
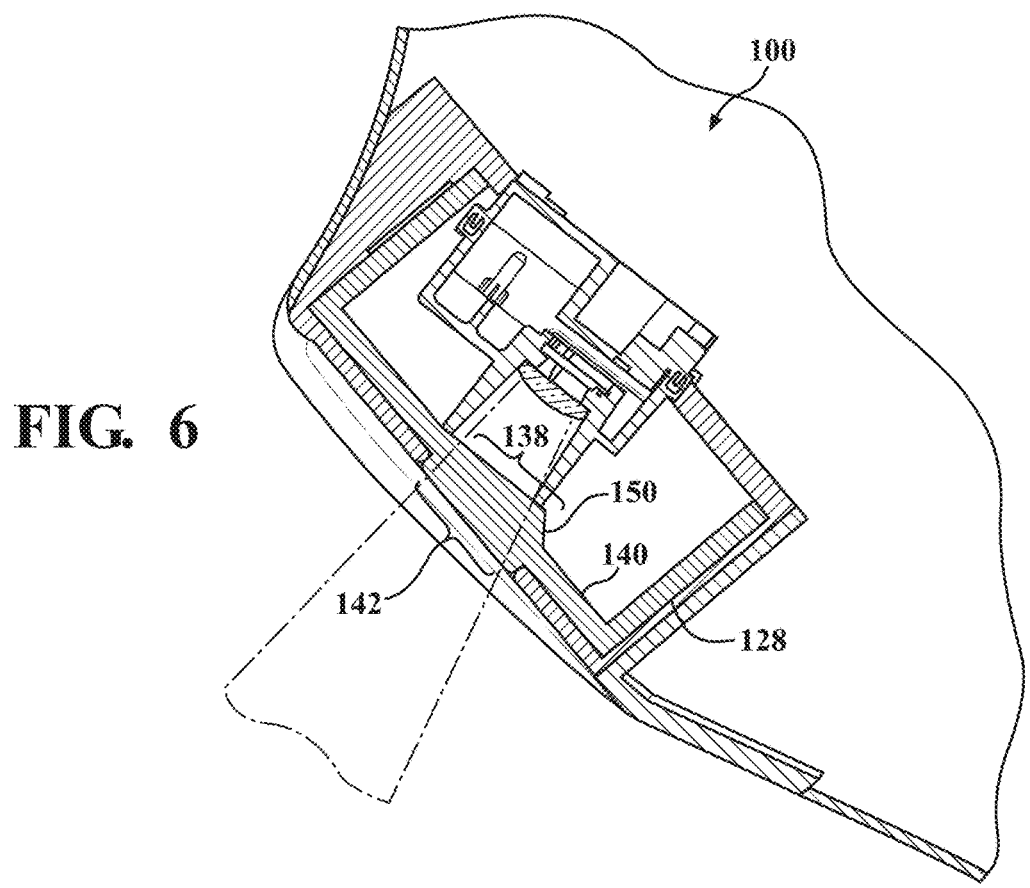
FIG. 6 is a side cross-sectional elevational view of the seamless lighting arrangement according to a second embodiment of the invention.
Figure 7:
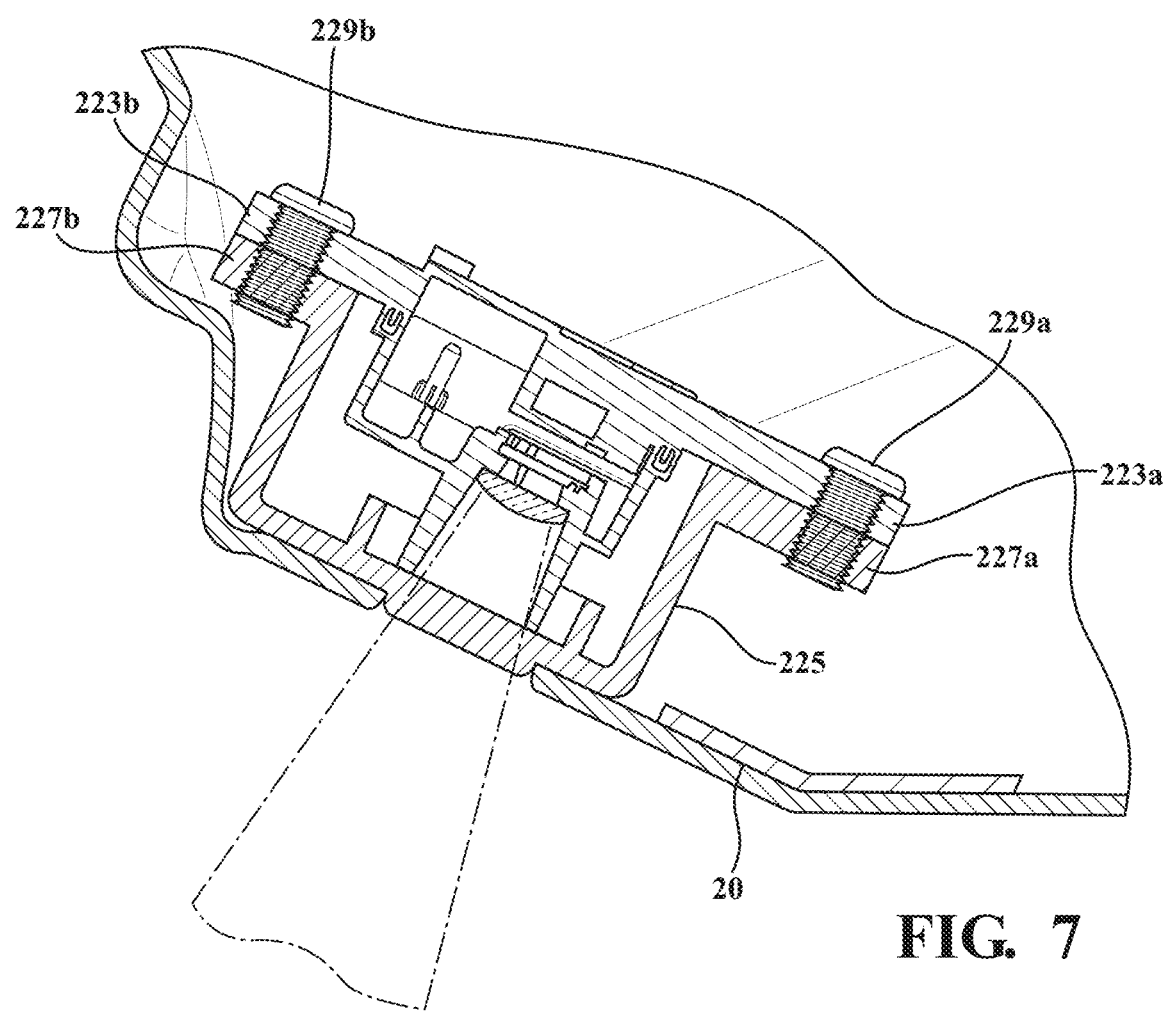
FIG. 7 is a side cross-sectional elevational view of the seamless lighting arrangement according to a third embodiment of the invention.

FIG. 6 shows an alternate embodiment having a seamless lighting arrangement 100. Like reference numbers are used to indicate identical structures shown in the other figures. In this particular embodiment a lens 128 has an inside surface 140 that has a wedge 150 formed thereon. The wedge 150 is formed so at least a portion of the wedge 150 is formed on a light input surface region 138 so that light received from the light projector port 34 is deflected and exits a light output surface region 142 at an angle relative to the direction light is received at the light input surface region 138. This is helpful when it is desirable to project light at a specific angle that might be different from the angle or shape of the outside surface 16 of the vehicle panel 12.

Figure 12:
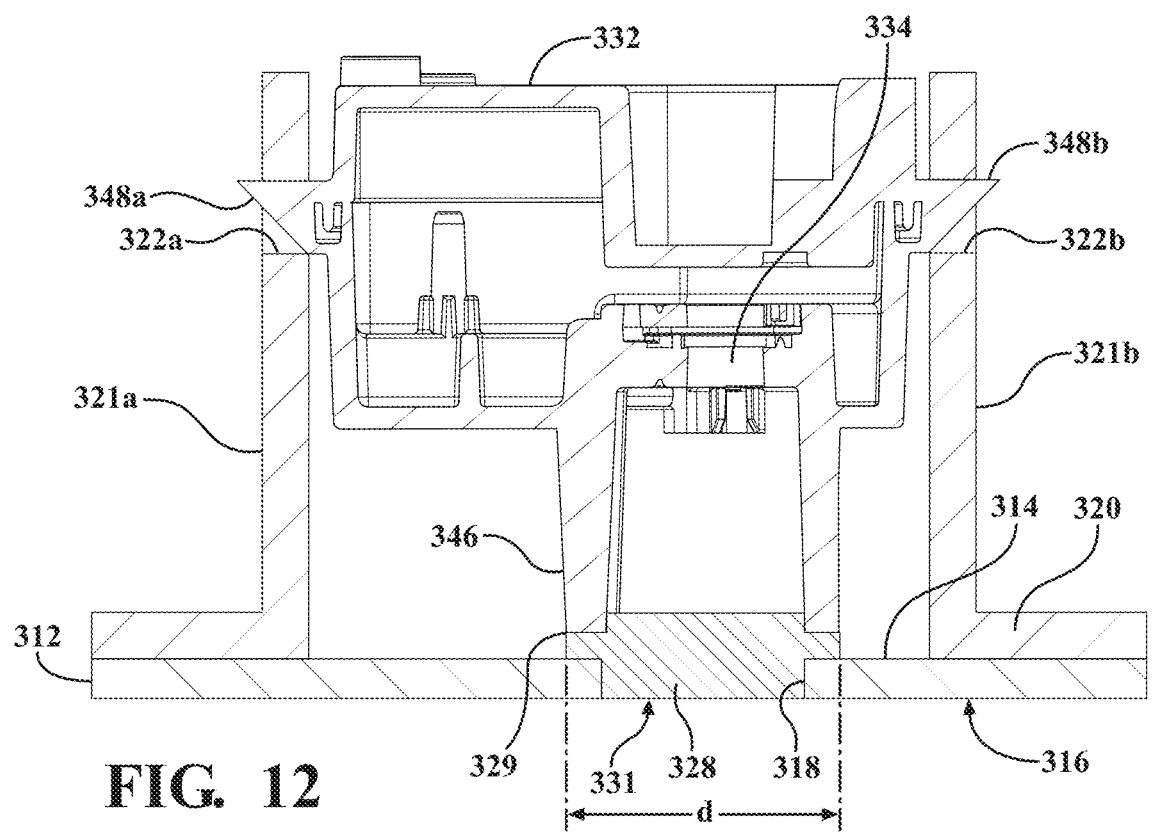
FIG. 12 is a cross-sectional side elevational view of another embodiment of a seamless lighting arrangement having a projector connected to a fixing bracket of a vehicle panel.
Figure 13:
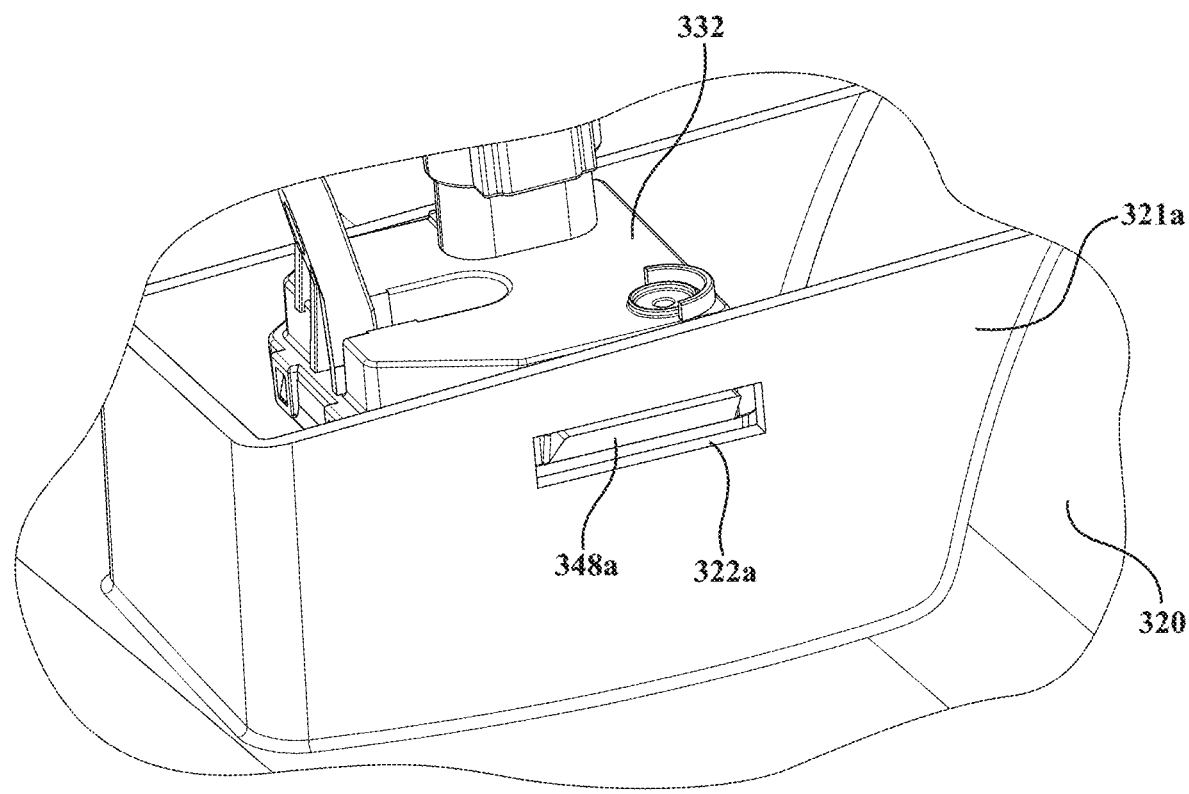
FIG. 13 is an enlarged side perspective view of the seamless lighting arrangement according to FIG. 12.
Figure 14:
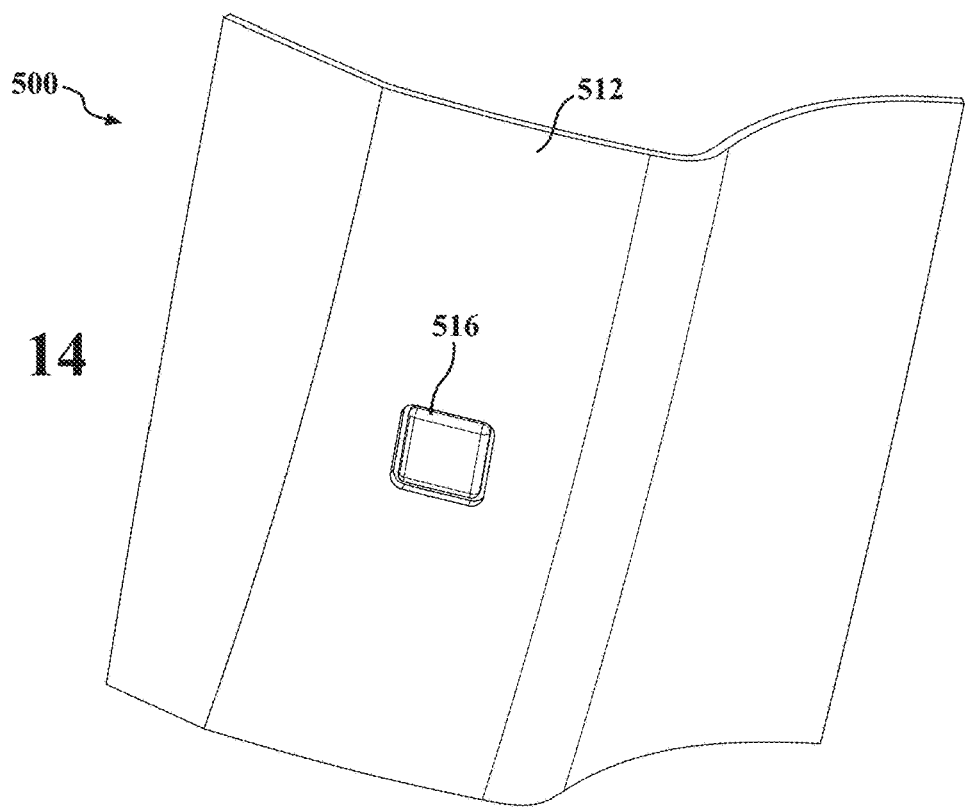
FIG. 14 is a bottom perspective view of a vehicle panel with a seamless lighting arrangement with a locking lens according to another embodiment of the invention.
Figure 15:
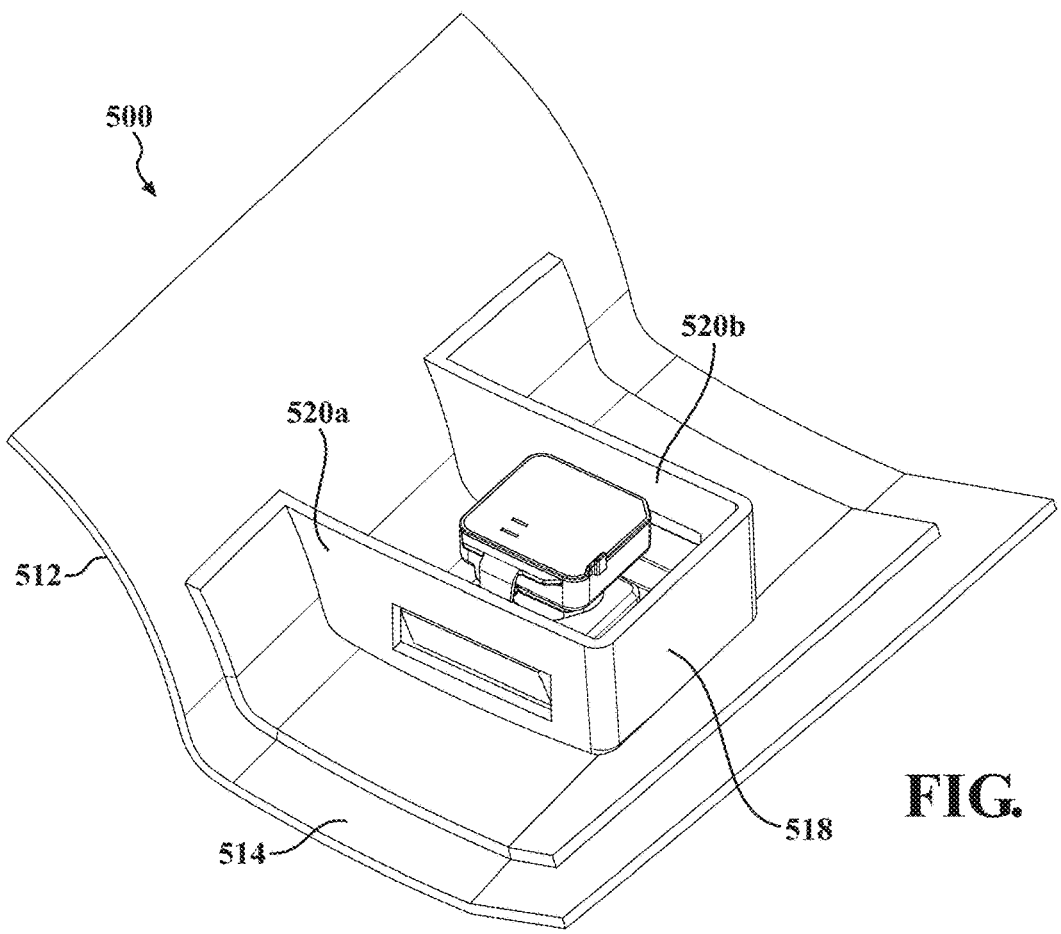
FIG. 15 is a top perspective view of a vehicle panel with a seamless lighting arrangement with the locking lens.

Referring now to FIGS. 12 and 13 a seamless lighting arrangement 300 according to another embodiment is shown. In this particular embodiment there is a vehicle panel 312 with a light aperture 318, formed through the vehicle panel 312. Connected to an inside surface 314 of the vehicle panel 312 is a bracket 320 with two walls 321a, 321b extending away from the inside surface 314. The two walls 312a, 321 b each have a fitting aperture 322a, 322b spaced at a distance from the light aperture 318. A light unit 332, similar to the light units mentioned above, has a projector port 334 and a light tube 346. However, the seamless lighting arrangement 300 is different from the seamless lighting arrangement 10, 100 mentioned above there is a lens 328 that is much smaller and has a shoulder 329 that is connected to or welded to a distal end of the light tube 346. As shown the shoulder 329 of the lens 328 is less than or equal to outer diameter d-d of the light tube 346. The connection between the distal end of the light tube 346 and the shoulder 329 is accomplished using welding, adhesives or other suitable connections that will create a watertight seal to prevent water from getting inside of the light tube 346.

The lens 328 further includes a transmission portion 331 that extends from the shoulder 329 and is positioned within the light aperture 318 of the vehicle panel 312. An outer surface of the transmission portion 331 is flush with an outer surface 316 of the vehicle panel 312 to create a seamless look with no change in depth between the outer surface of the light transmission portion 331 and the outer surface 316 of the vehicle panel 312. In order to ensure that a consistent flush mount occurs, the connection between the bracket 320 and the light unit 332 must be consistent and reproducible. Therefore, snap tangs 348a, 348b are provided on the light unit 332 for connecting the light unit 332 to the bracket 320. The snap tangs 348a, 348b respectively snap into the fitting aperture 322a, 322b to connect the lighting unit 332 to the bracket 320. The combination of the snap tangs 348a, 348b and fitting aperture 332a, 332b controls the indexing of the lens 328 in the light aperture 318 of the vehicle panel 312. Stated another way the combination of the snap tangs 348a, 348b and fitting aperture 322a, 322b control how far into the transmission portion 330 of the lens 328 is positioned into the light aperture 318, thereby providing a consistently reproducible flush surface between the outer surface 331 of the lens 328 and the outer surface 316 of the vehicle panel 312. The seamless lighting arrangement 300 of the present embodiment is desirable for use in applications where the larger lens described above is not possible due to spatial constraints, but it is still necessary to provide a sealed light unit with a lens outer surface that is flush, or seamless, with the outer surface of the vehicle panel.

Figure 9:
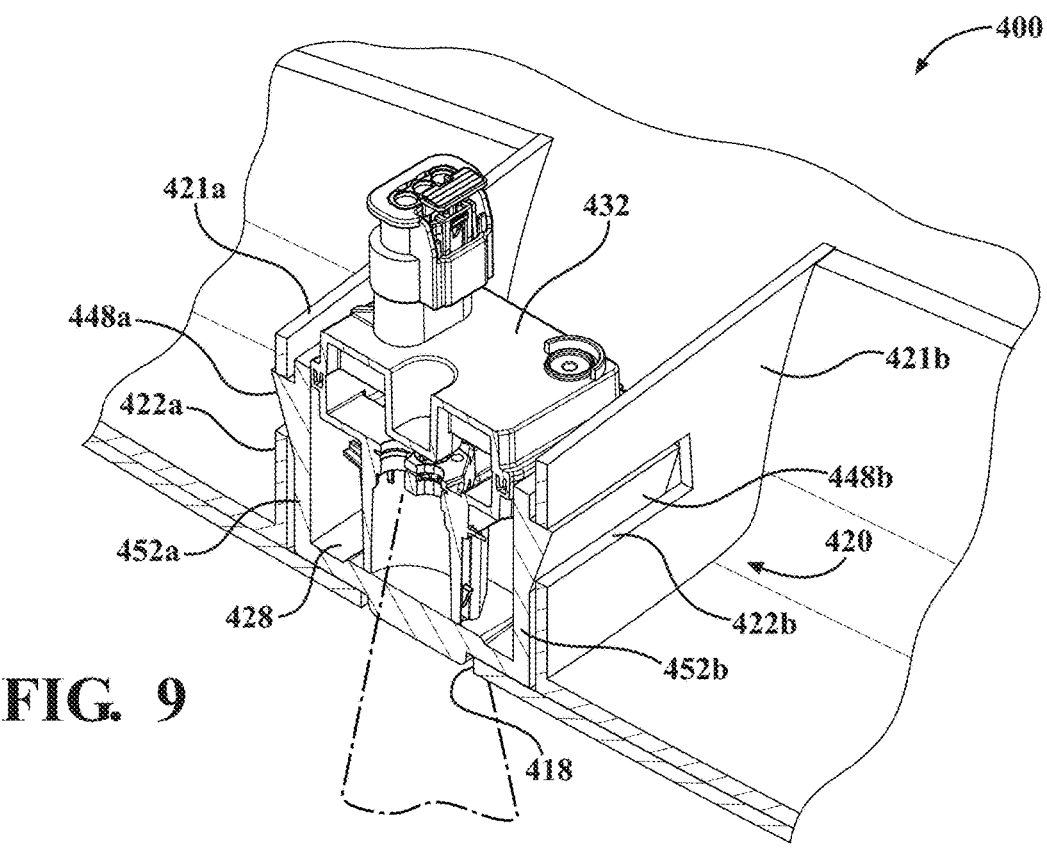
FIG. 9 is a cross-sectional front side perspective view of another embodiment of a seamless lighting arrangement having a U-shaped lens connected to a fixing bracket of a vehicle panel.
Figure 10:
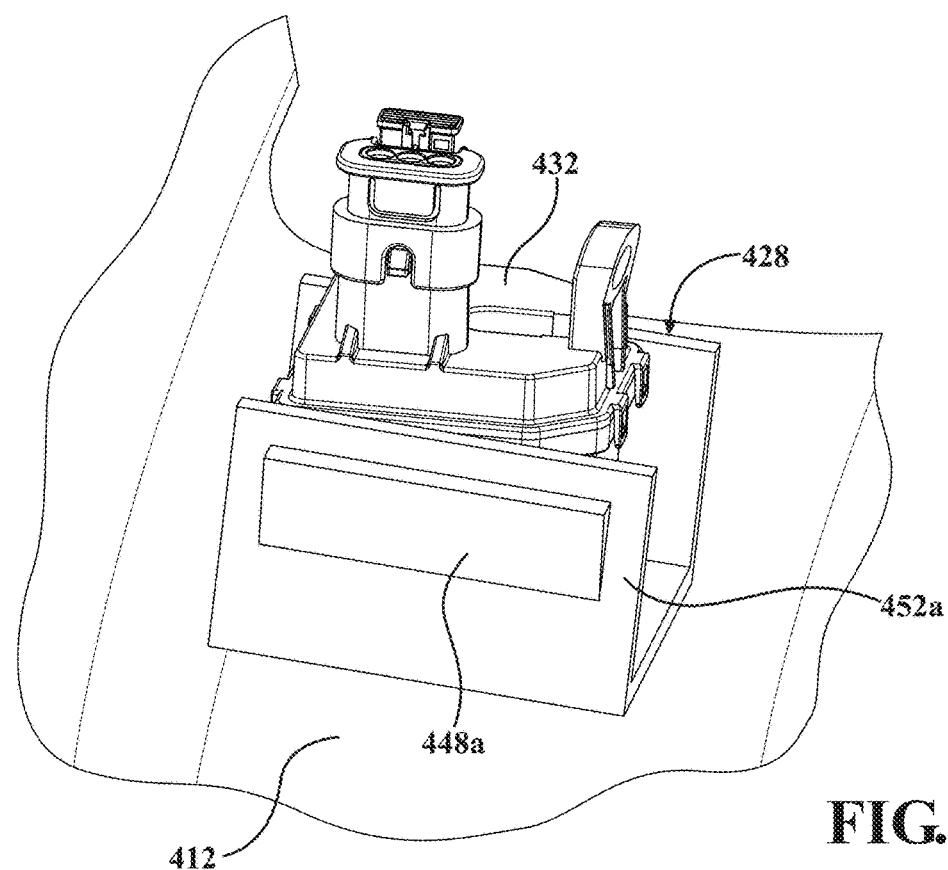
FIG. 10 is a side perspective view of the U-shaped lens with the fixing bracket removed.
Figure 11:
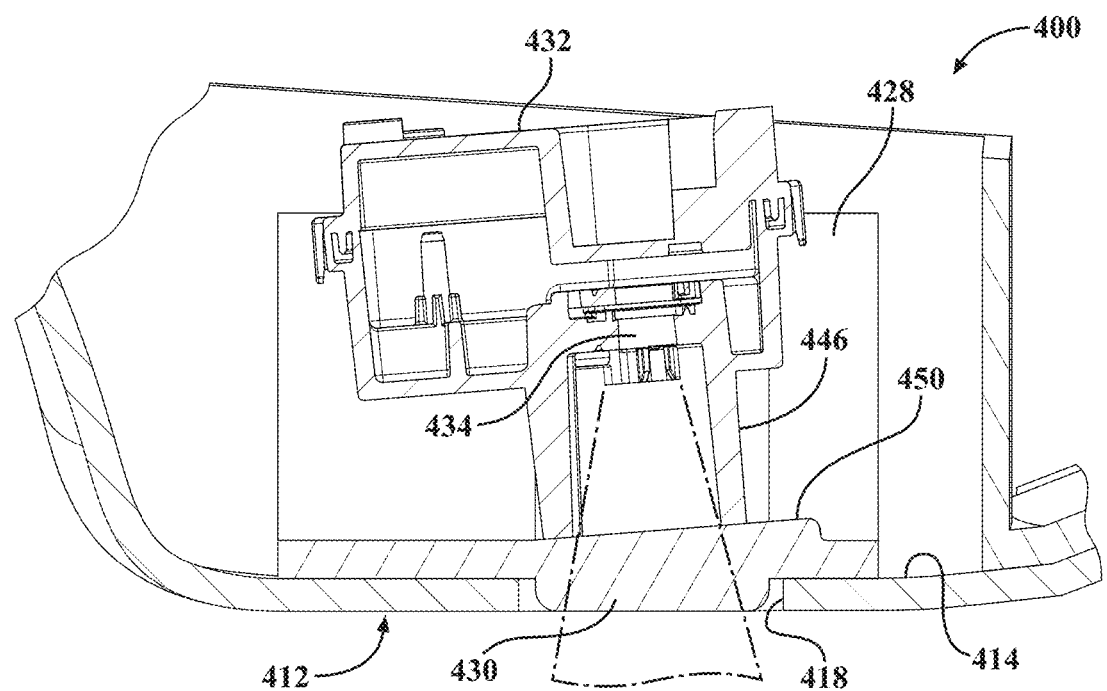
FIG. 11 is a cross-sectional side elevational view of the U-shaped lens connected to a fixing bracket of a vehicle panel.

Referring now to FIGS. 9-11, a seamless lighting arrangement 400 according to another embodiment is shown. In this particular embodiment there is a vehicle panel 412 with a light aperture 418 formed through the vehicle panel 412. Connected to an inside surface 414 of the vehicle panel 412 is a bracket 420 with two walls 421a, 421b each having a fitting aperture 422a, 422b spaced as a distance from the light aperture 418. A light unit 432, similar to the light units mentioned above, has a projector port 434 and a light tube 446. There is a lens 428 that is similar to lens 128 shown in FIG. 6, however, lens 428 is smaller in size because it has a U-shape with two open sides each adjacent opposing side walls 452a, 452b of the lens 428. The light unit 432 is connected to a wedge 450 formed on a surface of the lens 428 where a transmission portion 430 is located, which allows for light transmitted from the projector port 434 to exit the lens 428 at an angle to a light exit surface of the lens 428. A distal end of the light tube 446 is connected to the wedge 450 using welding, adhesives or other suitable connections that will create a watertight seal to prevent water from getting inside of the light tube 446. The wedge 450 has a surface area that contacts the light tube 446. This surface area of the wedge 450 is larger than the perimeter of the light tube 446 so that there does not have to be precise alignment when connecting the light tube 446 to the wedge 450.

The opposing side walls 452a, 452b of the lens 428 form the upright portions of the U-shape of the lens 428. Each of the two opposing side walls 452a, 452b have snap tangs 448a, 448b extending therefrom and engageable with a respective fitting aperture 422a, 422b of the bracket 420. The combination of the snap tangs 448a, 448b and fitting aperture 432a, 432b control the indexing of the lens 428 in the light aperture 418 of the vehicle panel 412 so that datum points of the light aperture 418 align in tolerance with datum points of the transmission portion 430 of the lens 428, the datum points of the light tube 336 and the datum points of the projector port 434. Stated another way the combination of the snap tangs 448a, 448b and fitting aperture 422a, 422b control how far into the transmission portion 430 of the lens 428 is positioned into the light aperture 418, thereby providing a consistently reproducible flush surface between the outer surface 431 of the lens 428 and the outer surface 416 of the vehicle panel 412. Also controlling the alignment of datum points of the light aperture 418, light transmission portion 430 of the lens, light tube 446 and projector port 434 will ensure that a desired projector light pattern from the seamless lighting arrangement 400 is achieved.

The seamless lighting arrangement 400 of the present embodiment is desirable for use in applications where the larger lens described FIGS. 1-8 above are not possible due to spatial constraints, but it is still necessary to provide a sealed light unit with a lens outer surface that is flush or seamless, with the outer surface of the vehicle panel.

Referring now to FIGS. 14-22 a seamless lighting arrangement 500 with a locking lens 502 according to another embodiment is shown. In this particular embodiment there is a vehicle panel 512 with a light aperture 516 formed through the vehicle panel 512. Connected to an inside surface 514 of the vehicle panel 512 is a bracket 518 with two walls including a first wall 520a and second wall 520b. The first wall 520a has a lock aperture 522 each spaced as a distance from the light aperture 516. The second wall 520b has a locator aperture 523 spaced at a distance from the light aperture 516.

There is a locking lens 502 that is similar in purpose to the other lenses 128, 428 but has different location, locking features and datums that will now be discussed. The locking lens 502 has a locking tab 524, a locator tab 526 and a lens portion 528, all of which are each integrated together as one piece. The locking lens 502 connects to the bracket 518 so that the locator tab 526 slides tough the locator aperture 523 and a locking tab 524 engages the lock aperture 522, such that the locator tab 526 aligns the lens portion 528 so a light output surface 530 of the lens portion 528 is positioned into the light aperture 516. The locking tab 524 secures the locking lens 502 to the bracket 518 so that the light output surface 530 of the locking lens 502 is positioned in the light aperture 516 of the vehicle panel 512.

Figure 16:
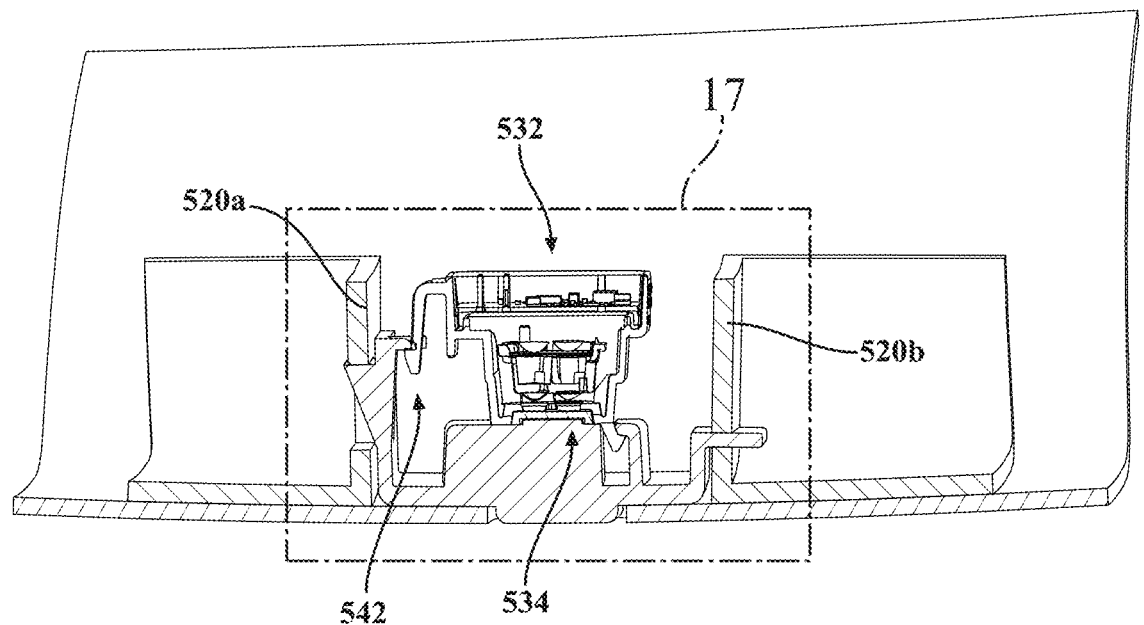
FIG. 16 is a cross-sectional side elevational view of a vehicle panel with a seamless lighting arrangement with the locking lens.
Figure 17:
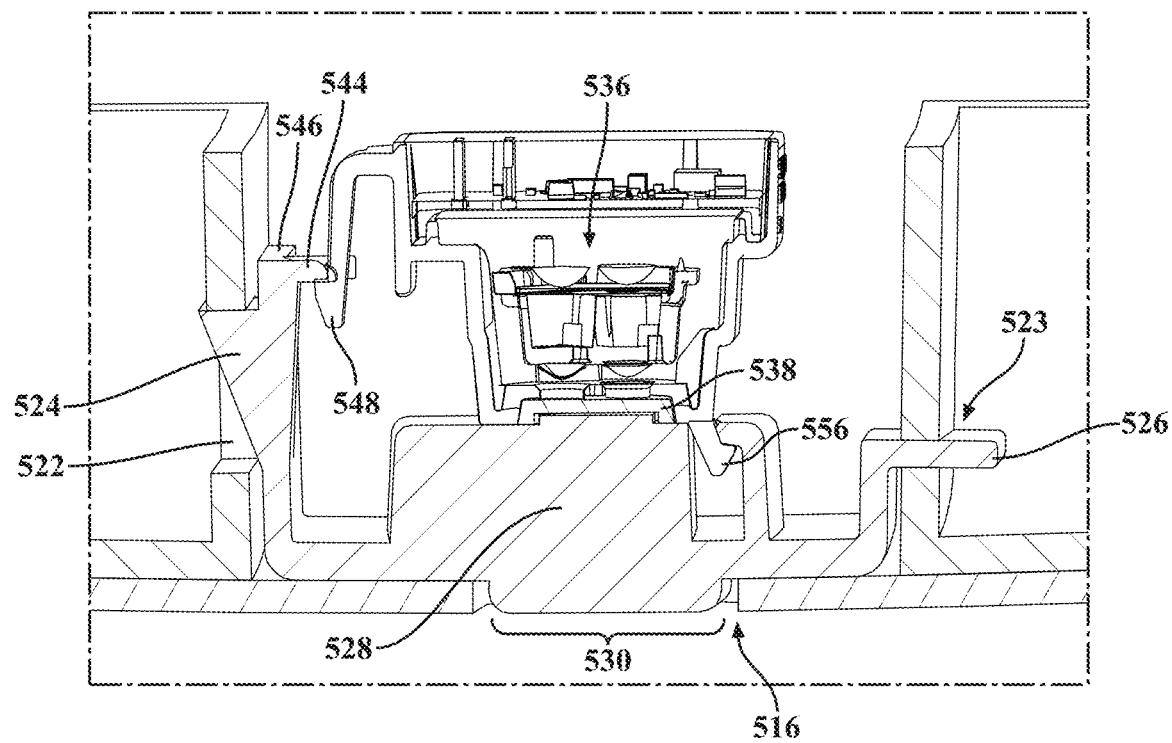
FIG. 17 is an enlarged cross-sectional side elevational view of a vehicle panel with a seamless lighting arrangement with the locking lens.
Figure 18:
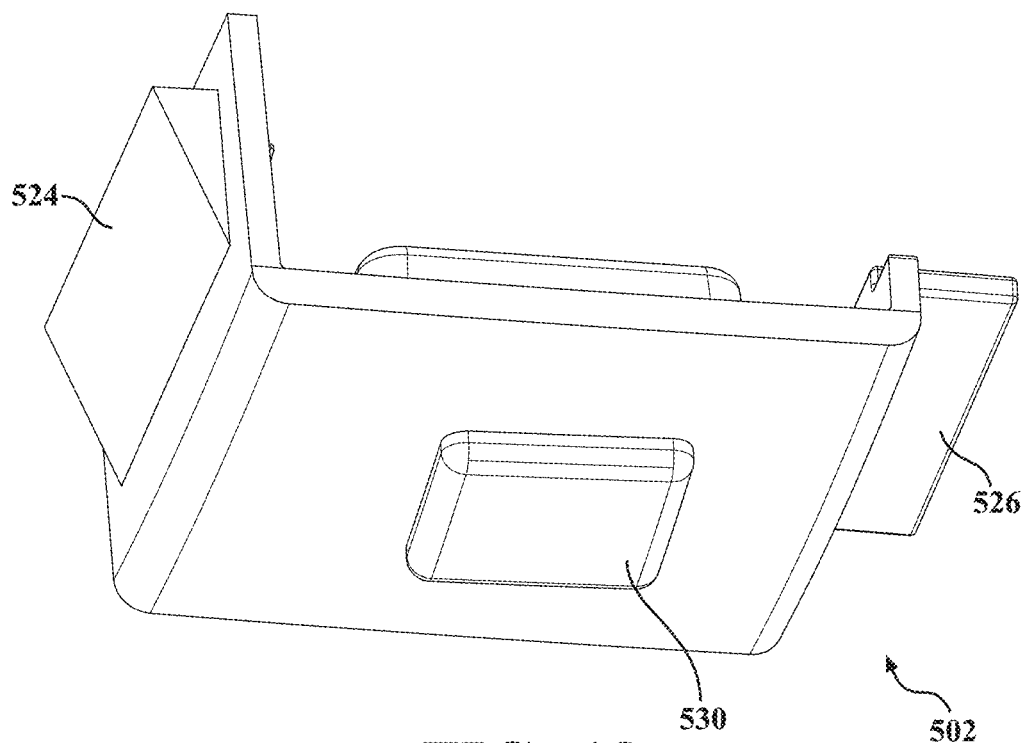
FIG. 18 is a bottom side perspective view of the locking lens.
Figure 19:
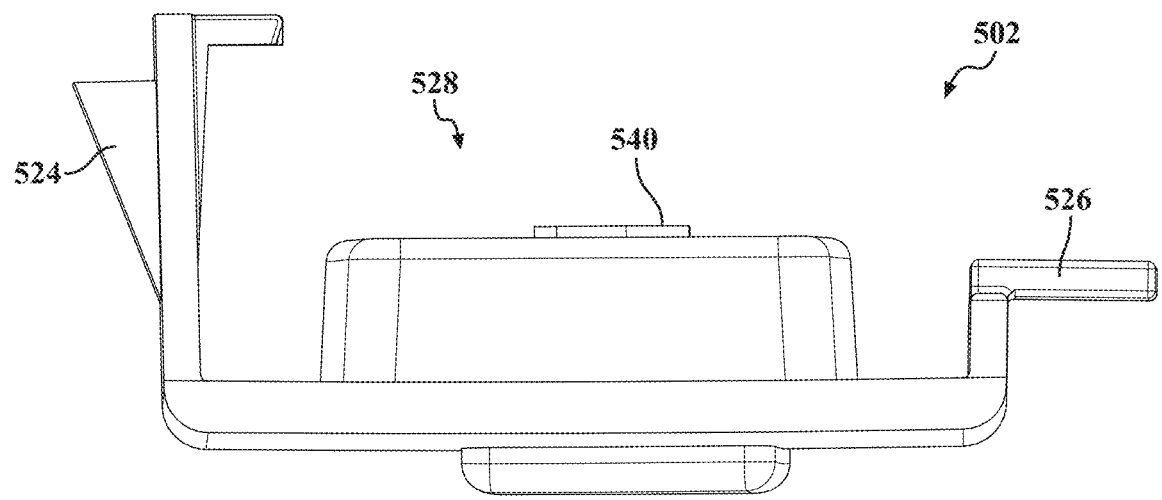
FIG. 19 is a side elevational view of the locking lens.
Figure 20:
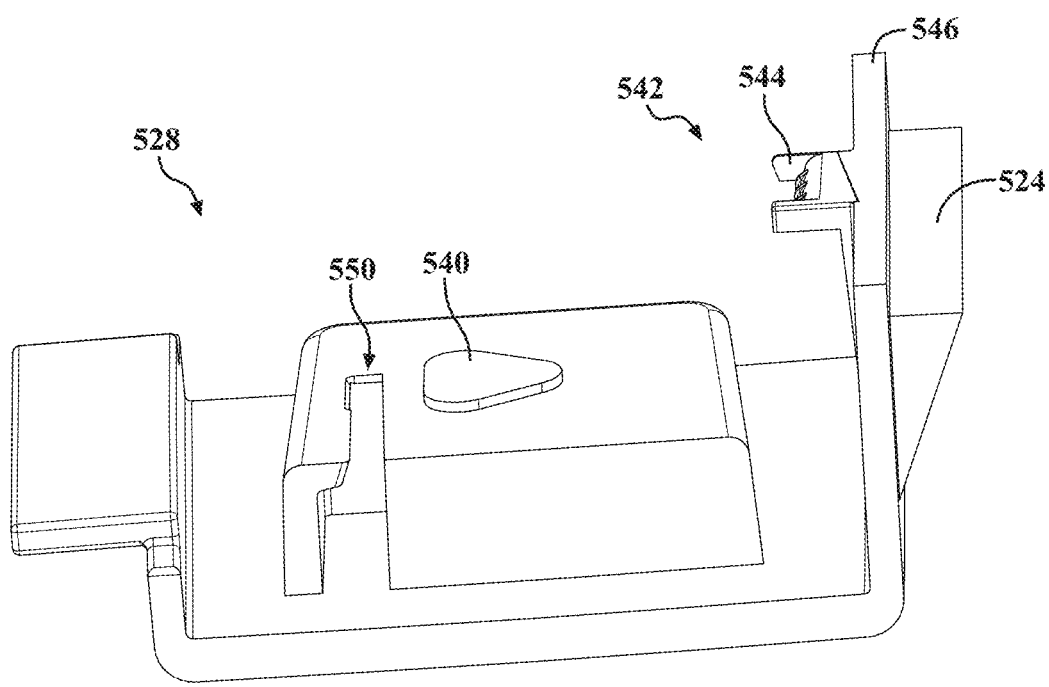
FIG. 20 is a top side perspective view of the locking lens.
Figure 21:
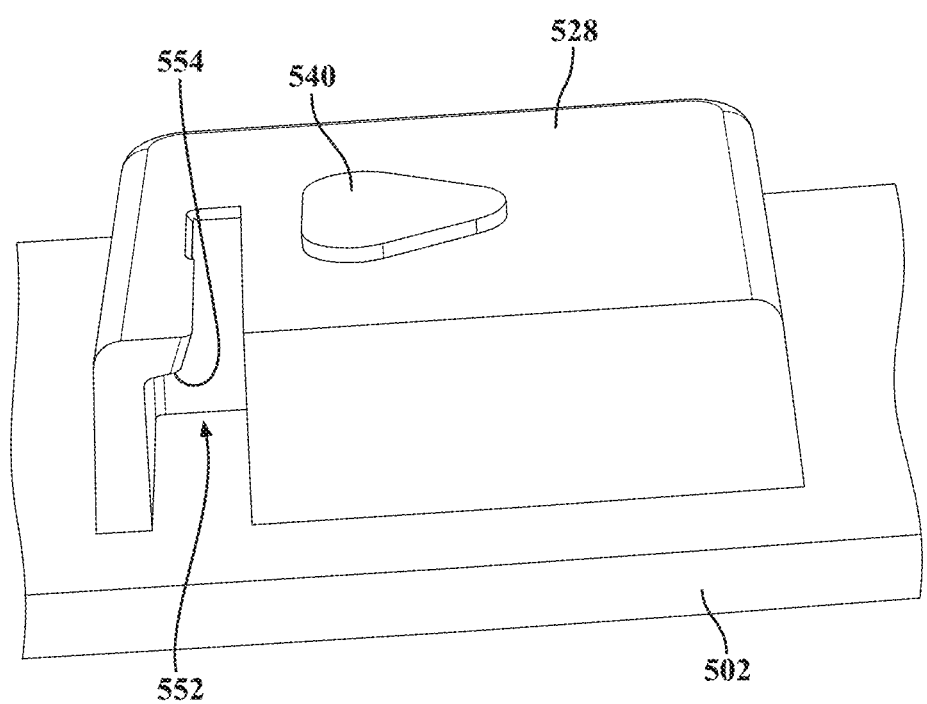
FIG. 21 is an enlarged side perspective view of a portion of the locking lens.
Figure 22:
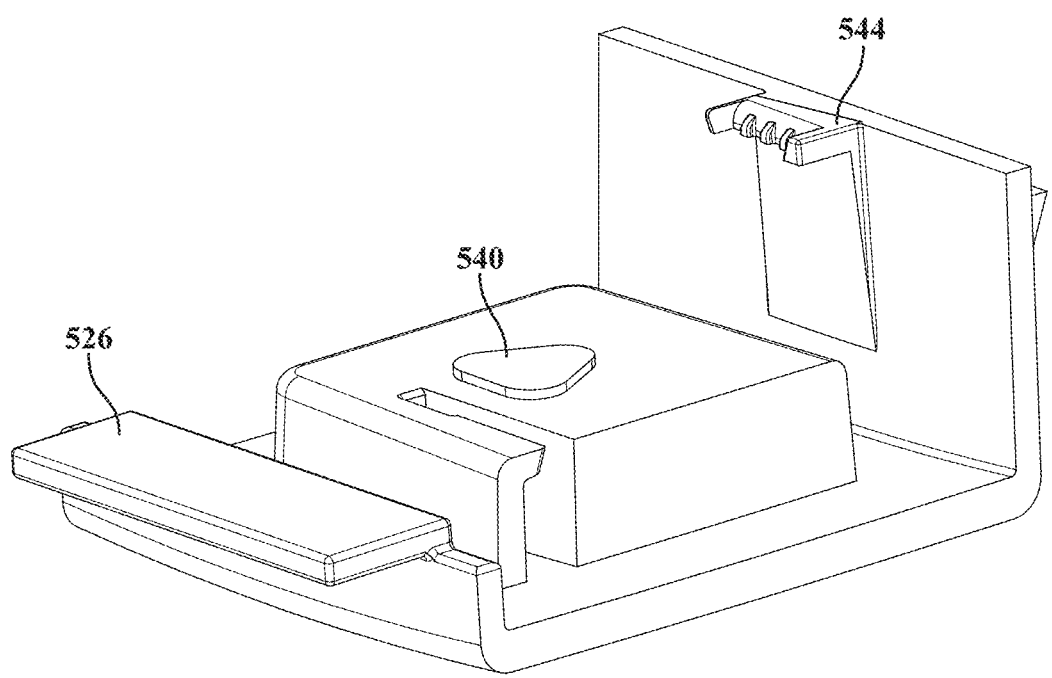
FIG. 22 is another top side perspective view of the locking lens.

As shown in FIGS. 16 and 17 there is a light unit 532 that includes a light output surface 534 for emitting light from a light source 536, which is shown as two light emitting diodes (LEDs). The light output surface 534 of the light unit 532 has a lock ring 538 that is configured to engage and snap onto a raised ridge 540 extending from the surface of the lens portion 528. The use of the lock ring 538 and the raised ridge 540 is optional, however, it does ensure proper optical alignment of the light source 536 to the light output surface 530 of the locking lens 502 so that a desired focal point and light pattern will be projected from the seamless lighting arrangement.

The light unit 532 further includes one or more lens engagement structures for engaging the one or more lock structures of the locking lens 502 to connect the light unit 532 to the locking lens 502, the details of which will now be described. The one or more lens engagement structures include structures formed on the light unit 532 that engage with corresponding structures on the locking lens 502. In particular the locking lens 502 has an upper locking datum 542 that is a tab 544 extending from an edge 546 of the locking lens 502 located above the light input side of the locking lens 502. The light unit 532 has an upper lens engagement structure 548 that is configured to engage the tab 544 of the upper locking datum 542. The upper lens engagement structure 548 is a flexible tang, however, it can take other forms depending on the needs of a particular application.

As shown in FIGS. 16 and 17, another type of lens engagement structure shown is a lower locking datum 550 located below the upper locking datum 542. The lower locking datum 550 includes a slot 552, which includes a tab 554, both of which are formed in the lens portion 528 of the locking lens 502. The light unit 532 includes a lower lens engagement structure 556 that is configured to slide into the slot 552 and engage the tab 554 of the lower locking datum 550. The combination of the upper locking datum 542 and the lower locking datum 550, locking tab 524 and the locator tab 526 collectively align and secure the locking lens 502 and light unit 532 in desired alignment with the light aperture 516 of the vehicle panel 512. With respect to the light unit 532 and locking lens 502 the upper locking datum 542 and the lower locking datum 550 both properly align and connect the light unit 532 to the locking lens 502, while the locking tab 524 and locator tab 526 of the locking lens properly align and secure the locking lens to the vehicle panel 512, so that the light output surface 520 is properly aligned into the light aperture.

In application the type of seamless lighting arrangement 10, 100, 300 and 400 implemented can vary depending on the needs of a particular application. Certain applications can have spatial requirements that require type to be used in preference to the other. As explained above the datum points between each of the different components of the arrangement can also dictate which one of the seamless lighting arrangement 10, 100, 200, 300, 400 and 500 is chosen. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seamless lighting arrangement for a vehicle panel comprising:
   a vehicle panel having an inside surface and an outside surface;
   a light aperture extending from the inside surface of the vehicle panel to the outside surface of the vehicle panel;
   a bracket connected to the inside surface of the vehicle panel, wherein the bracket includes a first wall having a lock aperture spaced at a distance from the light aperture and a second wall having a locator aperture spaced at a distance from the light aperture, and
   a locking lens with a lens portion, a locking tab and a locator tab, wherein the lens portion, the locking tab and the locator tab are each integrated together as one piece, wherein the locking lens connects to the bracket so that the locator tab slides through the locator aperture and the locking tab engages the lock aperture such that the locator tab aligns the lens portion so a light output surface of the lens portion is positioned into the light aperture, and the locking tab secures the locking lens to the bracket so that the light output surface of the locking lens is positioned in the light aperture of the vehicle panel, wherein the locking lens further includes one or more lock structures formed in the locking lens;
   a light unit having a light output surface for emitting light from a light source, wherein the light output surface engages a light input side of the locking lens, and the light unit further includes one or more lens engagement structures for engaging the one or more lock structures of the locking lens to connect the light unit to the locking lens.

2. The seamless lighting arrangement for a vehicle panel of claim 1, wherein the one or more lock structures of the locking lens further includes at least one locking datum formed on the locking lens and at least one lock engagement extending from the light unit that engages the at least one locking datum to connect the light unit to the locking lens.

3. The seamless lighting arrangement for a vehicle panel of claim 1, wherein a transmission portion of the locking lens and an outside surface of the vehicle panel are flush when the light unit is connected to the bracket.

4. The seamless lighting arrangement for a vehicle panel of claim 1, wherein the light source is controlled by signals received from a controller located remote from the light unit.

5. The seamless lighting arrangement for a vehicle panel of claim 1, wherein the bracket has a flange that connects the bracket to the inside surface of the vehicle panel using adhesives, welding, fastener clips, snap lock features or fasteners.

6. The seamless lighting arrangement for a vehicle panel of claim 1, further comprising:
   a raised ridge formed on the light input side of the lens portion of the locking lens; wherein the light output surface of the light unit includes a lock ring around a portion of a perimeter of the light output surface that is configured to engage and snap onto the raised ridge of the lens portion so that a desired focal point and light pattern will be projected from the seamless lighting arrangement.

7. A seamless lighting arrangement for a vehicle panel comprising:
   a vehicle panel having an inside surface and an outside surface;
   a light aperture extending from the inside surface of the vehicle panel to the outside surface of the vehicle panel;
   a bracket connected to the inside surface of the vehicle panel, wherein the bracket includes a first wall having a lock aperture spaced at a distance from the light aperture and a second wall having a locator aperture spaced at a distance from the light aperture;
   a locking lens with a lens portion, a locking tab and a locator tab, wherein the lens portion, the locking tab and the locator tab are each integrated together as one piece and the locking lens connects to the bracket so that the locator tab slides through the locator aperture and the locking tab engages the lock aperture such that the locator tab aligns the lens portion so a light output surface of the lens portion is positioned into the light aperture, and the locking tab secures the locking tab secures the locking lens to the bracket so that the light output surface of the locking lens is positioned in the light aperture of the vehicle panel;
   an upper locking datum that is a tab extending from an edge of the locking lens located above a light input side of the locking lens;
   a lower locking datum that is a slot formed in the locking lens with a tab located below the upper locking datum;

a light unit having a light output surface for emitting light from a light source, wherein the light output surface engages a light input side of the locking lens, wherein the light unit;

an upper lens engagement structure that is configured to engage the tab of the upper locking datum, and a lower lens engagement structure that is configured to slide into the slot and engage the tab of the lower locking datum.

8. The seamless lighting arrangement for a vehicle panel of claim 7, wherein the tab of the upper locking datum is located above the locking tab of the locking lens.

9. The seamless lighting arrangement for a vehicle panel of claim 7, wherein the slot of the lower locking datum extends below the light input side of the locking lens.

10. The seamless lighting arrangement for a vehicle panel of claim 7, wherein a transmission portion of the locking lens and an outside surface of the vehicle panel are flush when the light unit is connected to the bracket.

11. The seamless lighting arrangement for a vehicle panel of claim 7 wherein the light source is controlled by signals received from a controller located remote from the light unit.

12. The seamless lighting arrangement for a vehicle panel of claim 7, wherein the bracket has a flange that connects the bracket to the inside surface of the vehicle panel using adhesives, welding, fastener clips, snap lock features or fasteners.

13. The seamless lighting arrangement for a vehicle panel of claim 7, further comprising:

a raised ridge formed on the light input side of the lens portion of the locking lens; wherein the light output surface of the light unit includes a lock ring around a portion of a perimeter of the light output surface that is configured to engage and snap onto the raised ridge of the lens portion so that a desired focal point and light pattern will be projected from the seamless lighting arrangement.

* * * * *